US 8,453,771 B1

(12) United States Patent
Hirschfeld (10) Patent No.: US 8,453,771 B1
(45) Date of Patent: *Jun. 4, 2013

(54) BEACH WAGON

(76) Inventor: Steven L. Hirschfeld, Montclair, NJ (US)

( * ) Notice: Subject to any disclaimer, the term of this patent is extended or adjusted under 35 U.S.C. 154(b) by 376 days.

This patent is subject to a terminal disclaimer.

(21) Appl. No.: 12/832,424

(22) Filed: Jul. 8, 2010

Related U.S. Application Data (63) Continuation-in-part of application No. 11/639,731, filed on Dec. 14, 2006, now Pat. No. 7,762,363.

(51) Int. Cl.
*B62B 3/00* (2006.01)

(52) U.S. Cl.
USPC ......... 180/65.1; 180/19.1; 180/89.1; 280/651

(58) Field of Classification Search
USPC ...... 180/65.1, 19.1–19.3, 89.1, 908; 280/638, 280/651, 655.1, DIG. 5, DIG. 11
See application file for complete search history.

(56) References Cited

U.S. PATENT DOCUMENTS

| | | |
|---|---|---|
| 753,284 A | 3/1904 | Maxim |
| 2,765,843 A | 10/1956 | Nilles |
| 3,146,524 A | 9/1964 | Veilleux |
| 3,446,304 A | 5/1969 | Alimanestiand |
| 3,704,758 A | 12/1972 | Cropp |
| 4,452,234 A | 6/1984 | Withjack |
| 4,570,731 A | 2/1986 | Oaks |
| 4,570,732 A | 2/1986 | Craven |
| 4,796,909 A | 1/1989 | Kirkendall |
| 4,856,810 A | 8/1989 | Smith |
| 4,874,055 A | 10/1989 | Beer |
| 4,878,554 A | 11/1989 | Dion |
| 4,887,836 A | 12/1989 | Simjian |
| 4,913,252 A | 4/1990 | Bartley |
| 4,948,077 A | 8/1990 | Gonzalez |
| 4,973,206 A | 11/1990 | Engle |
| 5,028,062 A | 7/1991 | Pinnell |
| RE33,769 E | 12/1991 | Harrod |
| 5,161,630 A * | 11/1992 | Garin et al. ................. 180/65.31 |
| 5,271,634 A * | 12/1993 | Walton ..................... 280/33.992 |
| 5,307,889 A | 5/1994 | Bohannan |
| 5,327,989 A | 7/1994 | Furuhashi et al. |
| 5,449,224 A | 9/1995 | Johnson |

(Continued)

FOREIGN PATENT DOCUMENTS

| | | |
|---|---|---|
| CH | 659219 A5 | 1/1987 |
| DE | 3545709 A1 | 6/1987 |

(Continued)

*Primary Examiner* — Katy M Ebner
(74) *Attorney, Agent, or Firm* — Siegmar Silber, Esq.

(57) ABSTRACT

A beach wagon is disclosed which is convertible from a beach-wagon to a table. The wagon is used for transporting goods and contains a large cargo container with an open top. The beach wagon is easily converted from motorized to manual and back again, through the disengagement and re-engagement of the drivetrain. When motorized, a d-c battery-driven motor drives the rear wheels, and the rechargeable battery thereof is optionally aided by a solar panel. Forward gearing includes low-speed for pavement and hard sand and high-speed for soft sand. A rectangular deck has a pair of table leaves hingedly attached thereto and operable between an open and closed position. The leaves form opposite sides of a cargo container and in the closed position form a table. A pair of container panels attach to the table leaves and deck to form the cargo container.

10 Claims, 10 Drawing Sheets

U.S. PATENT DOCUMENTS

| | | | |
|---|---|---|---|
| 5,465,985 A | 11/1995 | Devan et al. | |
| 5,653,458 A | 8/1997 | Chaparian | |
| 5,676,415 A | 10/1997 | Ament | |
| 5,704,623 A | 1/1998 | Chapman | |
| 5,758,921 A | 6/1998 | Hall | |
| 5,857,695 A * | 1/1999 | Crowell | 280/651 |
| 5,961,172 A | 10/1999 | Ament et al. | |
| 6,076,621 A | 6/2000 | Horn | |
| 6,131,925 A | 10/2000 | Weldon | |
| 6,167,936 B1 | 1/2001 | Stover et al. | |
| 6,257,358 B1 | 7/2001 | Roach | |
| 6,308,792 B1 | 10/2001 | Garrett | |
| 6,312,048 B1 | 11/2001 | Kilmer | |
| 6,354,611 B1 | 3/2002 | Mihalic et al. | |
| 6,386,558 B1 | 5/2002 | Chang | |
| 6,408,961 B1 | 6/2002 | Chen | |
| 6,423,894 B1 | 7/2002 | Patz et al. | |
| 6,446,986 B1 | 9/2002 | Ames | |
| 6,502,656 B2 | 1/2003 | Weiss | |
| 6,554,087 B2 | 4/2003 | Huntsberger et al. | |
| 6,598,898 B2 | 7/2003 | Chu | |
| 6,626,453 B1 | 9/2003 | Theus et al. | |
| 6,662,888 B2 | 12/2003 | Betella | |
| 6,831,221 B2 | 12/2004 | Hulen | |
| 6,988,737 B1 | 1/2006 | Clark | |
| 7,055,642 B1 | 6/2006 | Chambers et al. | |
| 7,210,545 B1 * | 5/2007 | Waid | 180/65.1 |
| 7,338,053 B2 | 3/2008 | Dayton et al. | |
| 7,407,032 B1 | 8/2008 | Chambers et al. | |
| 2003/0015625 A1 | 1/2003 | McGee et al. | |
| 2004/0216933 A1 | 11/2004 | Coale | |
| 2004/0251647 A1 | 12/2004 | Graham | |
| 2005/0006155 A1 | 1/2005 | Lenkman | |
| 2005/0045409 A1 | 3/2005 | Fenelli et al. | |
| 2005/0252700 A1 | 11/2005 | Kitauchi et al. | |
| 2006/0086569 A1 | 4/2006 | Brown | |
| 2006/0208440 A1 | 9/2006 | Clark et al. | |
| 2008/0041644 A1 | 2/2008 | Tudek et al. | |

FOREIGN PATENT DOCUMENTS

| | | |
|---|---|---|
| EP | 479735 A1 | 4/1992 |
| JP | 63247121 A | 10/1988 |
| JP | 6371420 A | 3/1998 |

* cited by examiner

BEACH WAGON

RELATED APPLICATION

This application is a continuation-in-part of a patent application entitled Motorized Beach Wagon bearing application Ser. No. 11/639,731 and filed Dec. 14, 2006, now U.S. Pat. No. 7,762,363, issued Jul. 27, 2010.

BACKGROUND OF THE INVENTION

1. Field of the Invention

This invention relates to a beach wagon that is manually steerable, has a convertible, open-top container for receiving goods, which container is easily converted to a beachside tabletop that is at a convenient height for the beach chair occupant. Additionally, a motorized beach wagon is described having a drivetrain that is disconnectable for a free-wheeling mode and reconnectable for the motorized condition.

2. Background of the Prior Art

After driving to the shore, beachgoers typically find parking a considerable distance from the actual location selected for the day's outing. Often, a long walk across the sand is required which may be particularly burdensome when handling a combination of children, large beach towels, beach chairs, children's toys, umbrellas, extra clothes, coolers filled with food and drink, and other paraphernalia for the beach.

Without a wagon or similar device, the beachgoer frequently makes several round trips, all the while attempting to maintain control over the operation. Once on the beach, the present device converts from a wagon to a table, isolated from the sand. This enhances the utility of the device.

Beach wagons and carts are known in the art, but many of these presently available are similar to urban shopping carts and are not motorized or suited for the task. Such beach wagons and carts are generally supported by two wheels and the load is tilted in order to pull the entire load. The tires of these two-wheeled carts have insufficient surface area to prevent sinking into soft sand, and, when loaded become difficult to manage on the soft sand terrain.

A non-motorized attempt to cart heavy goods over sandy terrain is taught in the disclosure of Kirkendall, U.S. Pat. No. 4,796,909, entitled Low-Bed Service Cart which describes a four wheeled, pull-type wagon. The wagon of Kirkendall '909 is specially designed to carry folding chairs, ice chests, firewood, and other small items. This device, which is manually controlled and steered, is especially difficult to reverse when heavily loaded.

In the Kirdendall '909 patent a review of the pre-1988 cart patents is provided and includes (specific for beach use) patents to Maturo, U.S. Pat. No. 3,677,571; Frank, U.S. Pat. No. 3,826,511; and Willette, U.S. Pat. No. 4,316,615. In a later patent to Shapiro, U.S. Pat. No. 6,893,030 an extensive list of cart patents is provided with a substantial body of patents drawn from Class 280/Subclass 651 et seq.

Traveling picnic tables such as disclosed in U.S. Pat. No. 6,345,611 to Mihalic, et al. are known in the art. The table disclosed in the invention is collapsible and provides wheels and a handle. Thus, the device is portable, but no cargo container is provided in which to carry typical beach gear. Further, the device is not motorized, so that the user must pull the relatively heavy device by hand. The invention does not teach any mechanism to overcome difficulty in maneuvering the device over varied beach terrain.

The drivetrain of the invention has as its progenitor the child's ridable vehicle developed by Kransco in the mid-1980's and disclosed in U.S. Pat. No. 4,709,958 to Harrod and a subsequent reissue patent, No. RE 33,769. Later, after the Fisher-Price, Inc. and Mattel, Inc. merger, Mattel acquired Kransco and assigned the marketing and development to Fisher-Price. The intermediate entity was known as Mattel Power Wheels, Inc.

The Power Wheels devices have a mechanical platform—chassis, motors, gearing, power and control arrangement. Although the Power Wheel vehicles have the large inflatable wheels that provide a large footprint and a suitable center of gravity to function well on a variety of beach terrains, the platform required substantial modification for the within described use. While Power Wheels platform only teaches a ridable vehicle for children, there is no suggestion or teaching toward a motorized, manually steerable beach wagon.

Beyond the above novel features, the present invention is designed to allow the beach wagon to be easily converted from battery to manual power and then back again from manual to battery power. The specialized wheel assembly includes removable cotter pins set against compressed springs. When the cotter pins are removed from the axle, the compressed spring decompresses and pushes the wheel hub outward to disengage the drive mechanism. Once the drive mechanism is disengaged, the gearing of the motor is overcome and the beach wagon may be operated in a manual, free-wheeling condition. To return to the motorized condition, the springs are compressed, returning the wheel hub to the original position, and the cotter pins reinserted to maintain the compressed state.

In the present invention, the compartment is fully collapsible, adds little weight to the device, is sturdy, but provides a large volume with which to carry items. This is achieved, in part, by utilizing retractable, rollable covers. The prior art background for such covers are cargo space and luggage compartment covers as disclosed, for example, in the U.S. Pat. Nos. 5,961,172 and 5,676,415 to Ament, et al. There is no teaching known in the art towards combining such covers with table leaves to form side walls of a cargo container. Where rough terrain is not an issue such as in a park with well-worn or paved pathways, the motor may be unnecessary for proper navigation. Accordingly, a more lightweight version without the drivetrain and motorized components is also presented.

In the course of preparing this disclosure several patents became known to the inventor hereof. The following patents are believed to be relevant and are each briefly discussed:

U.S. Pat. No. 6,626,453 to Theus et al. discloses a rolling cart suitable for receiving and transporting items over loose ground such as sand. The cart is a two-wheeled vehicle with a large footprint for easy movement.

U.S. Pat. No. 6,131,925 to Weldon relates to a cart intended to provide easy means to transport items held on the cart platform to a sandy beach location. A foldable seat is provided so that the invention can serve as a beach chair and the carrying platform is supported at both ends by straps. A pressurized sprayer, holding fresh water, is provided for the purpose of cleaning off sand and salt water from people and accessories.

U.S. Pat. No. 4,863,075 to Romer is a beach caddy with runners for pulling the invention across a sandy surface and retractable wheels for rolling over paved surfaces. A refillable water tank is provided for washing, drinking, or any other use. Detachable tables are mounted on the sides of the caddy and can be set up to support items transported by the caddy.

U.S. Pat. No. 2,421,751 to Giordano discloses a collapsible shopping device consisting of a pair of folding side frames, each frame consisting of side bars pivotably connected to each other midway of their ends, one side bar of each frame having a ground wheel and the other side bar bearing engagement with the ground and provided with a handle on its upper end folding and a shopping receptacle supported on and between the two side frames.

U.S. Pat. No. 6,598,898 to Chu also discloses a collapsible shopping cart type device similar to the Giordano patent, but adapted for carrying articles to the beach. The compartment contains a vertical rear wall and horizontal bottom shelf. A flexible fabric bag is fastened and forms an open topped container for receiving items.

This wagon improves upon the prior art wagons and solves a long felt need to provide a device which is easy to manually control and maneuver in soft and hard sand. The beach wagon has a large cargo container that, once at the destination, readily converts to a beach-chair-high table. The drivetrain is capable of moving the beach wagon at a speed comparable to the normal walking speed of the operator and is easily disengaged for manual operation.

Thus, the present invention fulfills a long felt and unsolved need by provide a beach wagon and table in one device. The invention solves this need by being maneuverable, through either manual or batter power, both in forward and in reverse, is adjustable to various beach terrains, and provides both a large compartment for beach paraphernalia and a table for beach use.

SUMMARY

A beach wagon is disclosed which is convertible from a beach-wagon mode of operating to a table mode of operating. In the beach wagon mode the wagon is used for transporting goods and contains a large cargo container with an open top. The device of the present invention has an undercarriage with a pair of front wheels positioned by a manually controlled yoke for pivoting the front wheels and thereby steering the beach wagon.

The beach wagon is constructed without a drivetrain and motorized parts for complete lightweight manual operation. For motorized operation, the beach wagon is equipped with a drivetrain and motorized parts. When motorized, a novel wheel assembly allows the beach wagon to be easily converted from a motorized to a manually operated condition and then easily returned back to a motorized condition. The undercarriage also includes a d-c battery-driven motor which provides a motive force to the rear wheels. The battery, which is rechargeable, is optionally aided by a solar panel installed on the undercarriage for adding to and sustaining the energy of the battery. While various gearing arrangements between the drive motor and the driven wheels are within the contemplation of this invention, the best mode of practicing the invention includes a low-speed forward gear for pavement and hard sand, a high-speed forward gear for soft sand, and a reverse gear for maneuverability.

A substantially rectangular deck is positioned over the undercarriage. A pair of table leaves is hingedly attached to and spaced apart from opposite sides of the rectangular perimeter of the deck and operable between an open and closed position. In the open position the leaves form opposite sides of a cargo container and in the closed position form a table and a compartment between the table and the deck. A pair of container panels stowable in the compartment formed by the deck and table in the closed position are attached to the table leaves and deck to form the two side walls in the open position forming a wagon with a large cargo container.

OBJECTS AND FEATURES OF THE INVENTION

It is an object of the present invention to provide a manually steerable beach wagon which is convertible to a table.

It is another object of the present invention to provide labor-saving devices to aid in the transportation of beach gear and equipment in an efficient manner.

It is yet another object of the present invention to provide a durable, light weight, beach wagon which is both economical to produce and made from standard parts resulting in relatively low unit cost.

It is a further object of the present invention to provide a motorized beach wagon that is easily converted to a manually-powered beach wagon and then back again to a motorized condition.

It is a feature of the present invention that the beach wagon hereof is readily convertible from a wagon to a table and from a table to a wagon.

It is another feature of the present invention to provide a rechargeable battery and motor to power the device as well as a retractable solar panel which can be used to partially recharge the battery.

It is yet another feature of the present invention to provide a retractable handle, providing for easy storage, and incorporating an actuator and a gear selector.

Other objects and features of the invention will become apparent upon review of the drawing and the detailed description which follows.

BRIEF DESCRIPTION OF THE DRAWINGS

In the drawings, the same parts shown in various views are provided with the same reference designators. The foregoing Summary as well as the following detailed Description of the Preferred Embodiments of the present invention will be best understood when considered in conjunction with the drawings in which.

DESCRIPTION OF THE PREFERRED EMBODIMENTS

The present invention is directed to a beach wagon that has particular utility in transporting beach gear such as beach chairs, beach towels, children's toys, coolers and other beach paraphernalia. In the present invention, the drivetrain platform allows the device to be steered and/or maneuvered by a telescoping handle and the speed controlled to go forward and reverse at a comfortable walking speed of the operator. Further, the drivetrain is easily disengaged to convert from battery to manual power and then back again to battery power. The beach wagon and readily convertible to a manual operation. The beach wagon is also produced without the drivetrain and motorized components for a more lightweight manual operation. The device is manually steerable and, once on the beach, is readily convertible to a table for continued utility. The wagon adapts to various terrains—parking lot surface, pavement, soft sand, and hard sand—by specific gearing for applying motive force to the oversized tires.

Figure 1:
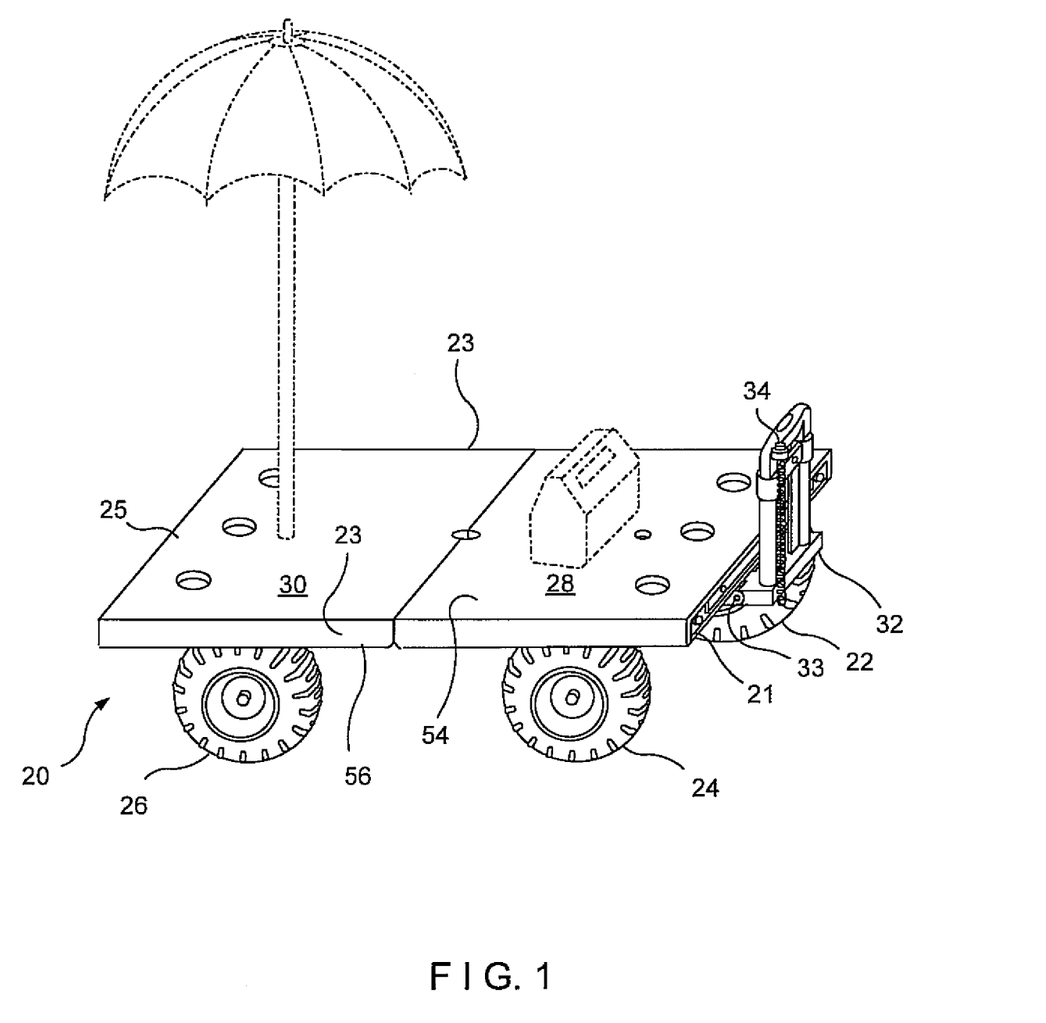
FIG. 1 is a perspective view of the motorized beach wagon of this invention as operated in the table mode and shown on the beach with the cargo container stowed.

Referring now to FIGS. 1 through 4 the motorized beach wagon of this invention is shown and is referred to generally by the reference designator 20. FIG. 1 showing the table configuration illustrates the wagon 20 being constructed with a deck or container platform 22 above front wheels 24 and rear wheels 26. The deck 22 is substantially rectangular and has a front-end 21, two sides 23 and a rear end 25. Below the deck 22 is the undercarriage 58 and drivetrain 59. The undercarriage 58 has a front end 61, two sides 63 and a rear end 65. Hingedly mounted to the deck 22 are table leaves 28 and 30. The telescoping handle 32 with pushbutton actuator 34 is used for steering and applying power to the wagon. The actuator 34 has an optional actuator harness (not shown) to secure the actuator 34 to the handle 32. The telescoping handle 32 is shown in FIG. 1 in a retracted condition and in FIG. 2 in the extended condition. The handle 32 is attached to the deck 22 with a hinge 33 to allow for stowing under the deck 22 and proper steering.

Figure 2:
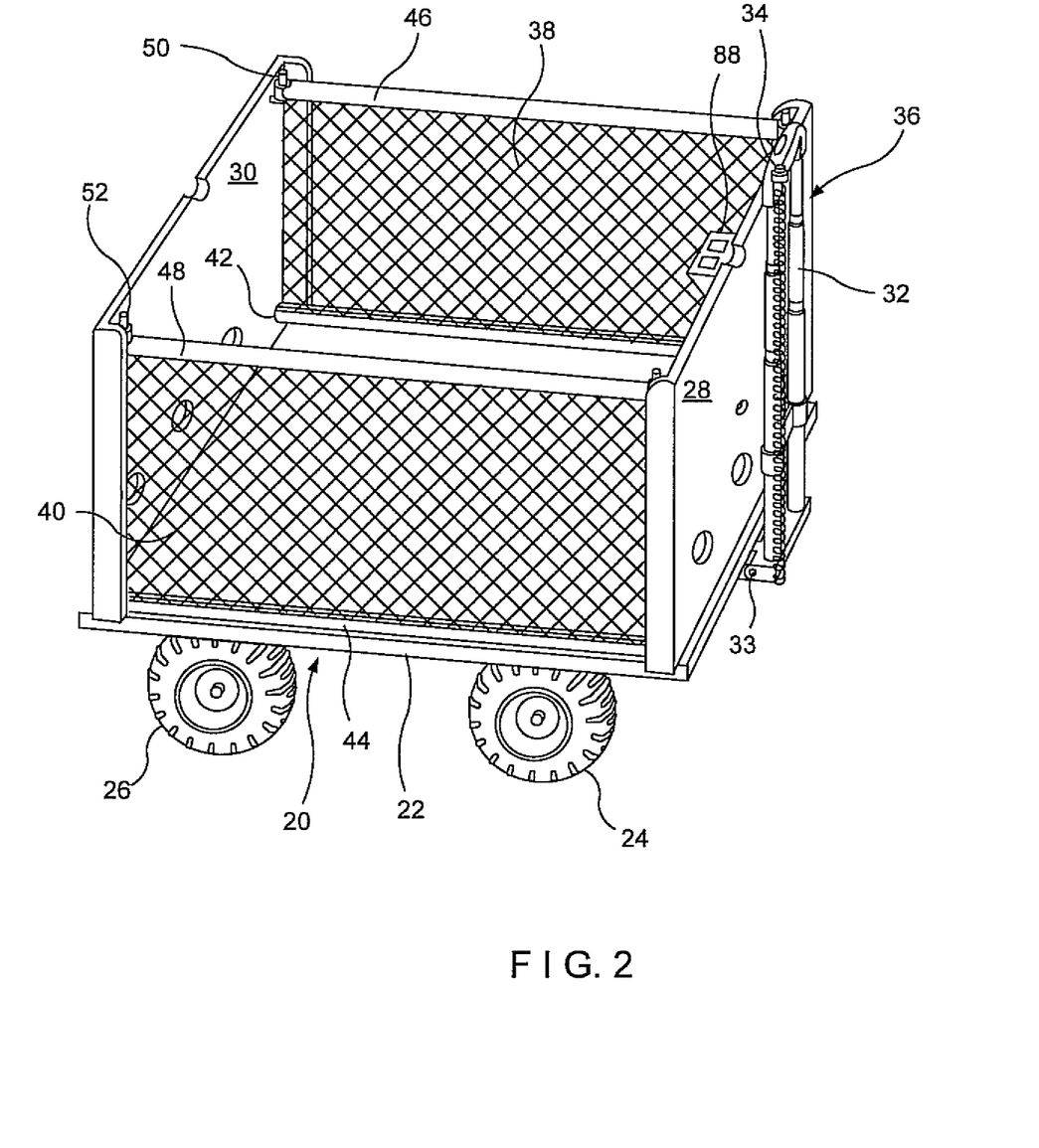
FIG. 2 is a perspective view of the motorized beach wagon of this invention as operated in the wagon mode with the cargo container erected.

In FIG. 2, the wagon 20 is illustrated in the carting mode with the table leaves 28 and 30 becoming the front and rear end panels of the cargo container 36. The remaining sides of the cargo container 36 are constructed from flexible webs or panels 38 and 40 mounted between spring rollers 42, 44 and header bars 46, 48. While in the best mode panels 38 and 40 are shown as flexible webs, it is within the contemplation of this invention that these panels can be solid, inflexible leaves mountable in an interlocking arrangement with end panels 28 and 30. The flexible panels 38 and 40 are constructed from a strong mesh material and alternatively may be constructed from a polymeric laminate, a technical textile, or a high-strength net.

The lightweight non-motorized beach wagon is shown in FIGS. 1 and 2, with the exception of the pushbutton actuator 34 and the gear selector 88. The pushbutton actuator 34 and gear selector 88 are unnecessary because there is no drivetrain assembly or motorized parts.

In the best mode as shown herein, the flexible webs or panels 38 and 40 are attachable to the end panels 28 and 30 by latch-and-release arrangement of an undercut channels or brackets 50 and 52 catching the ends of header bars 46 and 48, respectively, and being held in place by the tension of the spring rollers 42 and 44. Any common latching arrangement, such as an eye and pintle device, could serve this purpose without departing from the spirit of this invention.

When the side panels 38 and 40 are released, the spring tension of the spring rollers 42 and 44 wind the flexible material about the rollers adjacent the deck 22. The end panels or table leaves 28 and 30, which are rabbeted and hinged to limit opening to a substantially 90° swing, upon closure to form a planar tabletop 54, provide a compartment 56 between the tabletop 54 and the deck 22.

Figure 3:
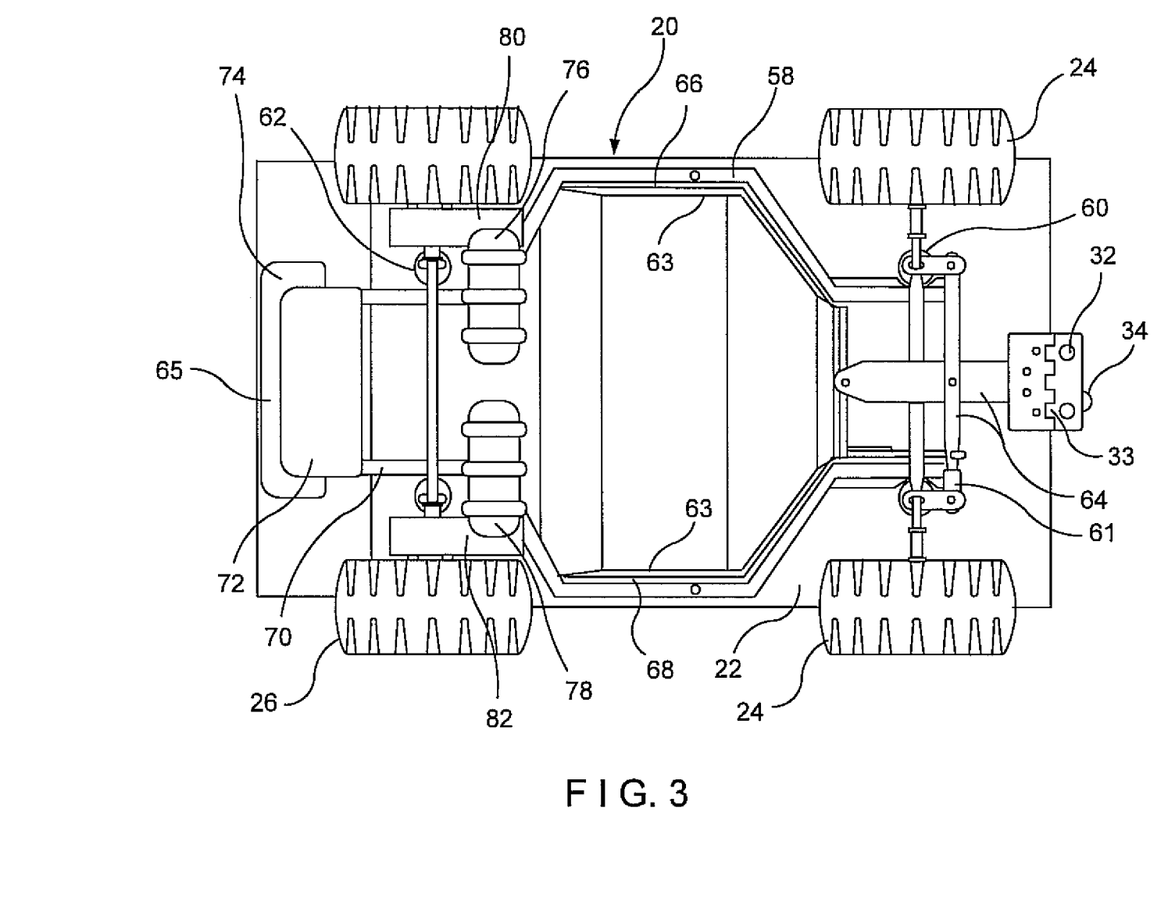
FIG. 3 is a bottom plan view of FIG. 1 showing the undercarriage, the steering arrangement for the front wheels and details of the drive wheels.

Referring now to FIG. 3 a bottom plan view of FIG. 1 shows the undercarriage 58 upon which the deck 22 is mounted on front bushings 60 and rear bushings 62. The front wheels 24 depend from the front end 61 of the undercarriage 58 and are yoked together and permit manual steering of wagon 20 through steering linkage 64 and, in turn, a telescoping handle 32. The siderails 66 and 68 form a major part of the chassis 70 from which the power and driving components depend.

Figure 4:
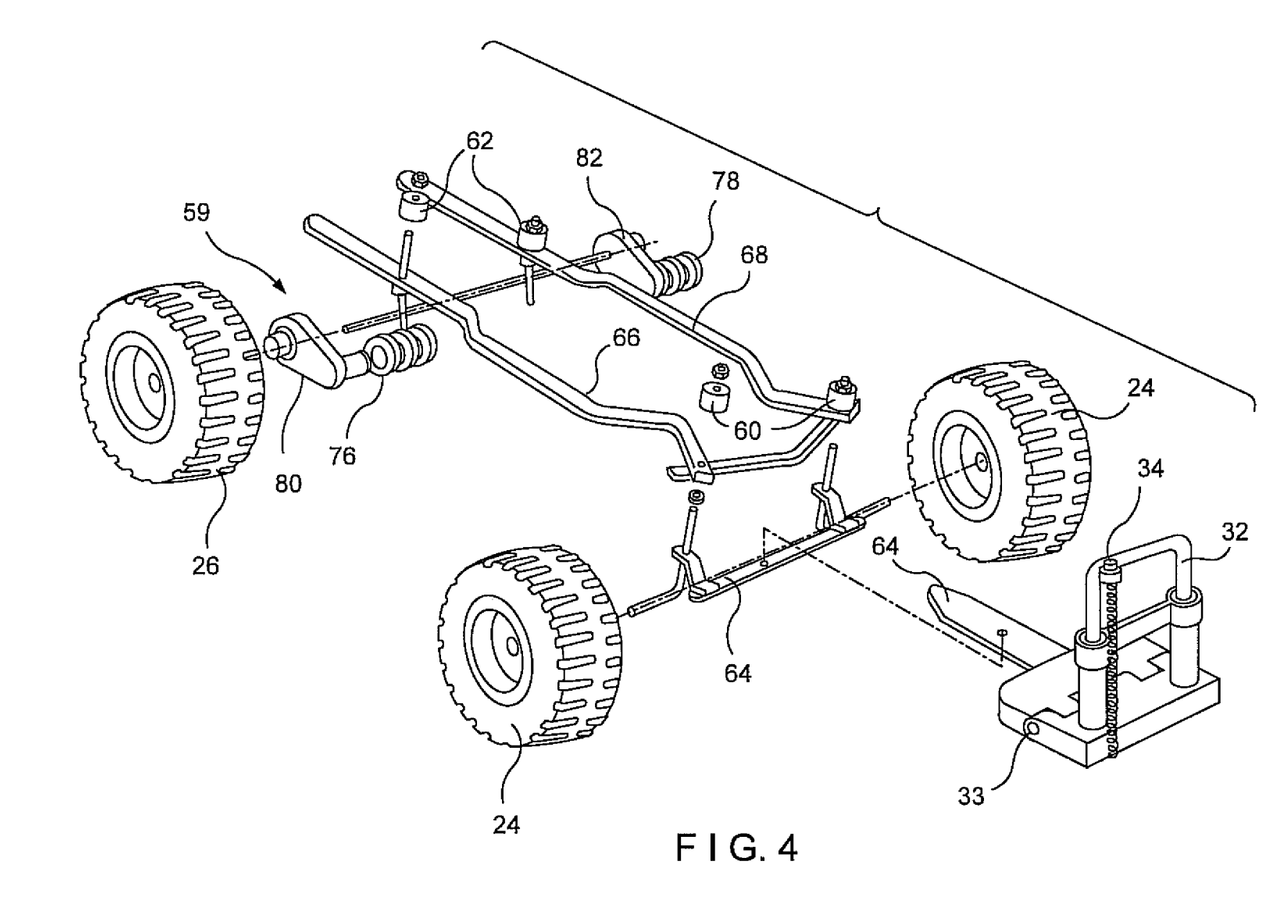
FIG. 4 is an exploded view of the steering components and other components assembled to the undercarriage.
Figure 5:
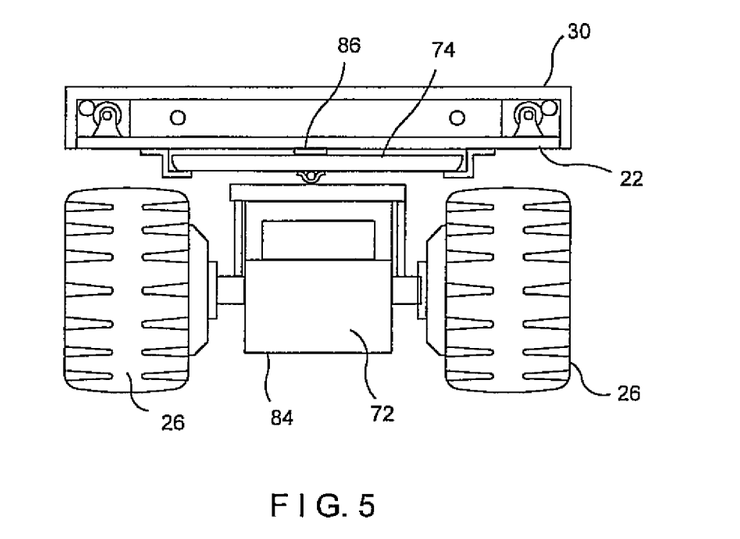
FIG. 5 is a rear elevational view of FIG. 1 showing further details of the battery housing and solar panel mounting.

The motorized beach wagon 20 of this invention, as best shown in FIGS. 3 through 5, when in battery-operated condition, is powered by a single, rechargeable 12-volt battery 72 and is housed at the rear of the wagon. The battery 72 is rechargeable using a 110-volt, trickle charger or a solar charger. An optional auxiliary solar panel 74, described in greater detail hereinbelow, adds energy to the battery while on the beach. The battery 72 provides power through pushbutton actuator 34 to two d-c, high torque electric motors 76 and 78. The motive force is applied to rear wheels 26 through gearboxes 80 and 82, respectively.

Referring now to FIG. 5 the battery 72 installation together with the auxiliary solar panel 74 is shown. The battery enclosure 84 is mounted on and depends from the undercarriage 58. The battery enclosure 84, in the embodiment shown, is conveniently positioned at the rearmost portion of the undercarriage facilitating removal of the battery for recharging.

Above the battery enclosure and on the bottom of deck 22, a small and efficient solar panel 74 is slidably mounted. The solar panel 74 is readily extended on the slide mechanism 86 so as to be positioned beyond deck 22. Once so positioned the solar panel 74 may be swivelled to maximize exposure to the rays of the sun. The solar energy converted to electrical energy merely tops off the battery resources and does not completely replace the need for the battery to be charged.

Figure 6:
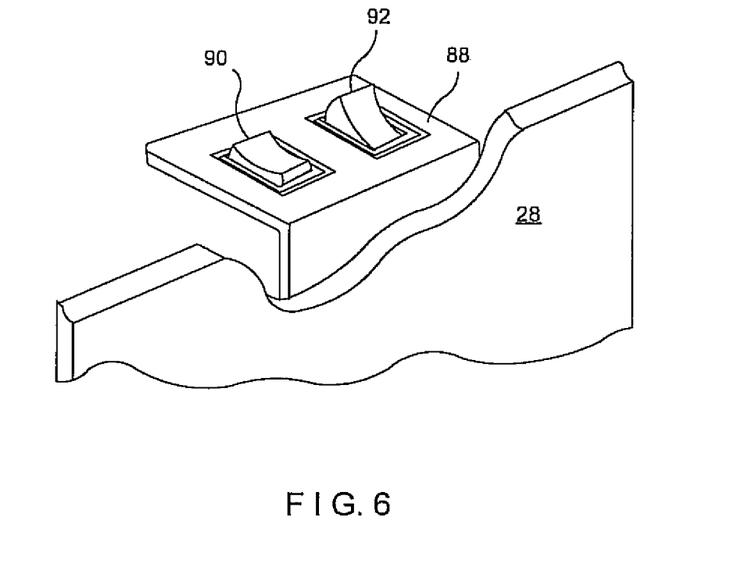
FIG. 6 is a partial perspective view of FIG. 2 showing further details of the gear selector control panel.

In driving the motorized beach wagon of this invention, control of the gearing is simplified using a convenient control panel or gear selector 88. The control 88, shown in more detail in FIG. 6, consists of two rocker switches 90, 92. Each switch 90, 92 has three positions; forward, off, and reverse. For pavement and hard sand surfaces one switch is set to the off position; and the other, to the forward position. At these settings, the device moves forward at low speed. For soft sand, both switches are set to the forward position. At these settings, the device operates at high speed. When both switches are in the reverse position, the device moves in reverse at high speed. When a single switch is in the reverse position and the other in the off position, the device moves in reverse at low speed. All other configurations will not move the device. Low speed on a hard surface approximates the average walking speed of a person or 2.5 mph. However, the high speed, when used for operating in soft sand and areas with less traction, helps maintain the wagon at walking speed. With the switches 90, 92 mounted on end panel 28, upon conversion of the device to a table, the control is housed out of reach in compartment 56.

The beach wagon is readily convertible from battery power to manual power in the event that the battery is fully discharged or the user determines that manual operation is sufficient to drive the wagon. To convert the beach wagon to manual power, the drivetrain 59 is manually disconnected from the wheel assembly 94 depending from the rear end 65 of the undercarriage 58. A solely manually-operated beach wagon is provided by removing the drivetrain and all motorized parts (not shown).

The wheel assembly as shown in more detail in FIGS. 7 through 14 contains an axle 96 with a pair of cavities 98. Set on the axle are a pair of hubs or drivers 91, adjacent to a pair of rings or driven ends 93. The rings 93 are set within the pair of rear wheels 26. A pair of compressions springs 95 are secured on the axle between the hubs 91 and the rings 93. The hubs 91 are attached to the drivetrain 59 and contain outwardly projecting appendages 97 that interlock with the inward impressions 99 of the rings 93. When the springs are compressed, the hubs 91 and the rings 93 maintain interlocked contact. When interlocked, the driving force of the hubs 91 is transferred to the rings 93 causing the rear wheels to turn and propel the beach wagon 20. Two sets of washer pairs (a first set 101 and a second set 103), surround the pair of cotter pins 105 set within the axle 96. R-Clip cotter pins are readily adaptable to the axle, but any similar pin or clip may be substituted. A pair of machine screws 107 are set on the axle 96 to secure the wheel assembly 94 on the axle 96. When the wheel assembly 94 is secured and the springs 95 compressed between the hubs 91 and the rings 93, the beach wagon is operable using battery power.

Figure 7:
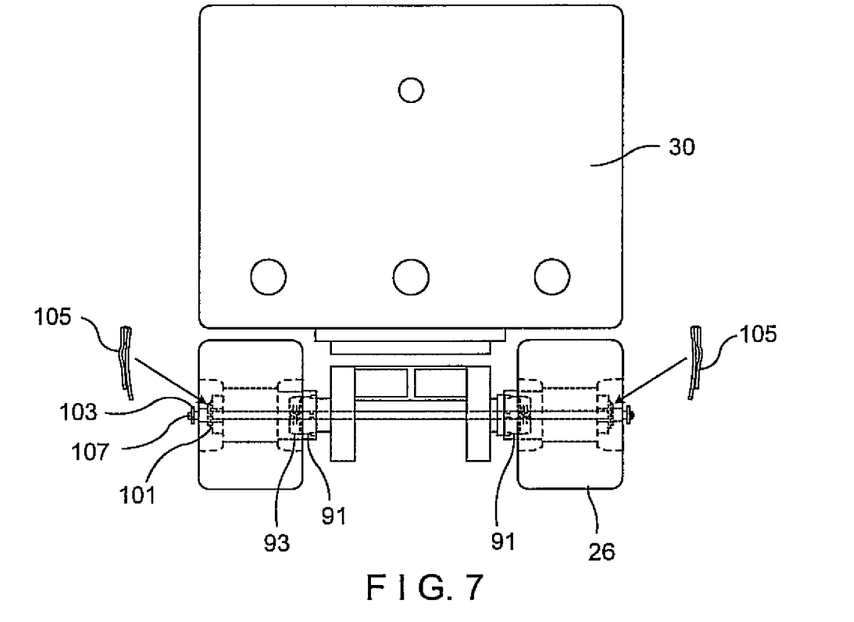
FIG. 7 is a rear elevational view of FIG. 1 showing further details of the drive system.
Figure 8:
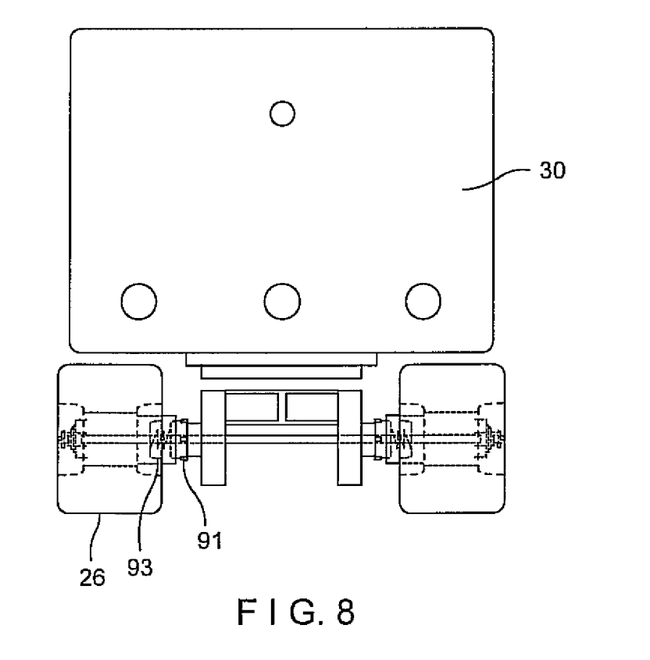
FIG. 8 is a rear elevational view of FIG. 1 with the drive assembly disengaged.
Figure 9:
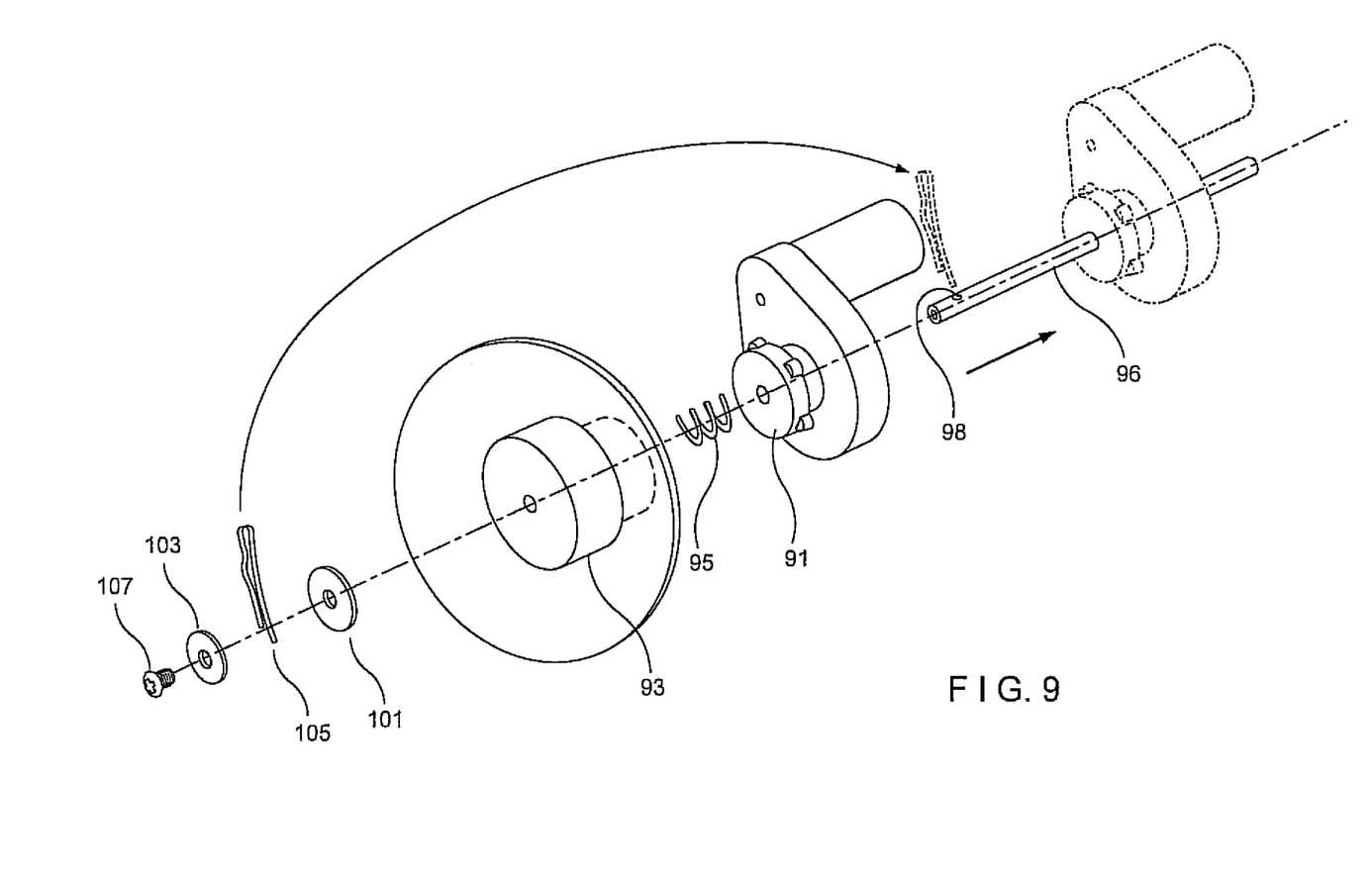
FIG. 9 is an exploded view of the wheel and drive assembly.
Figure 10:
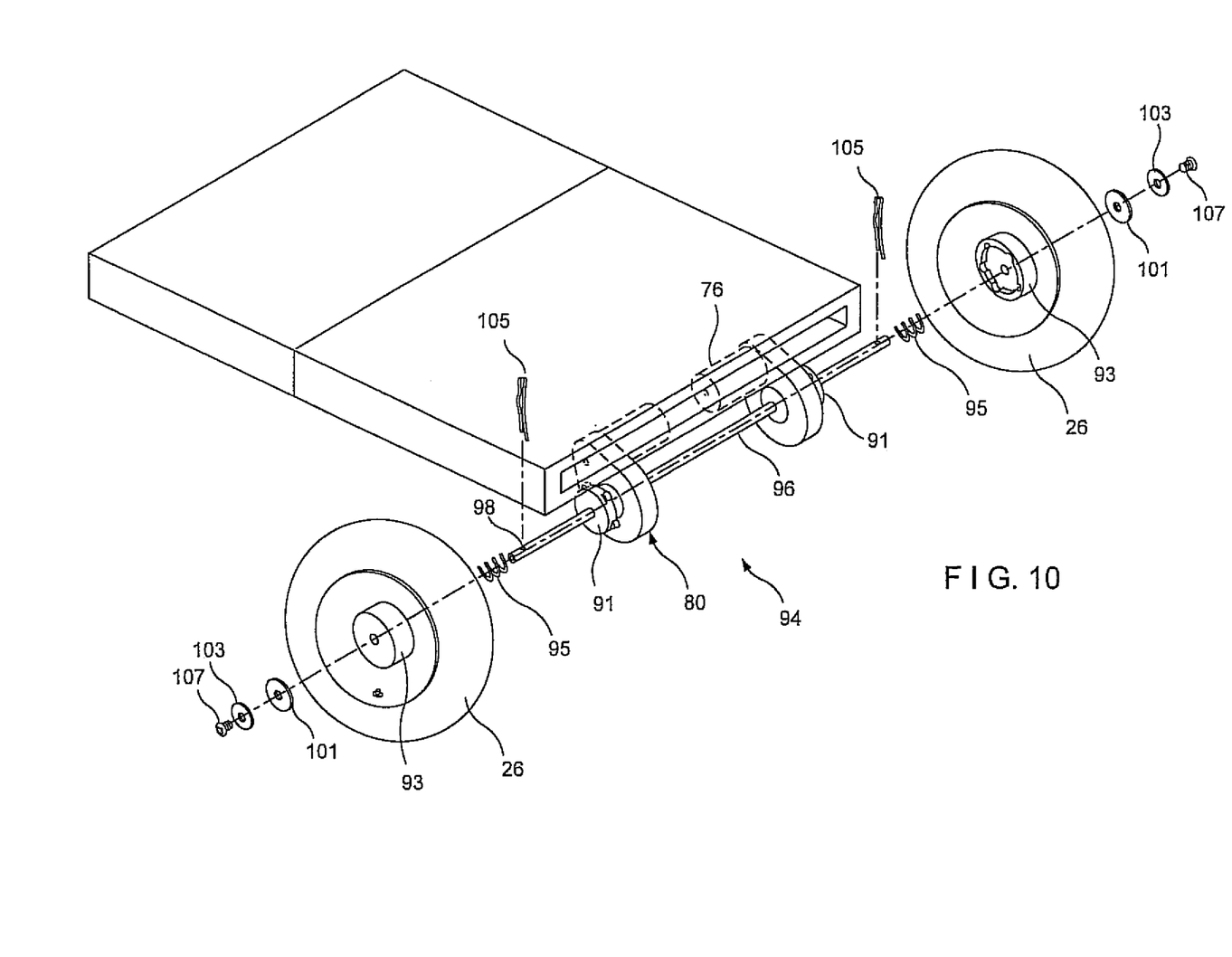
FIG. 10 is an exploded view of the wheel and drive assembly as mounted on the beach wagon operated in the table mode with the cargo container stowed.
Figure 11:
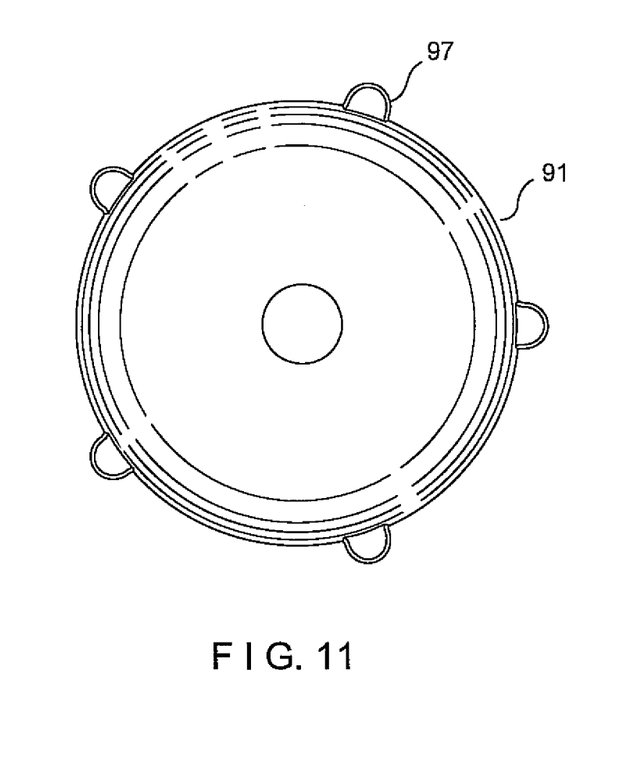
FIG. 11 is a top plan view of the hub to be attached to the drive mechanism.
Figure 12:
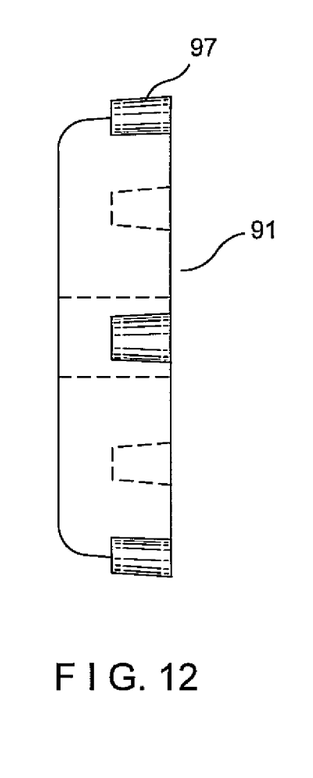
FIG. 12 is a side view of the hub of FIG. 11.
Figure 13:
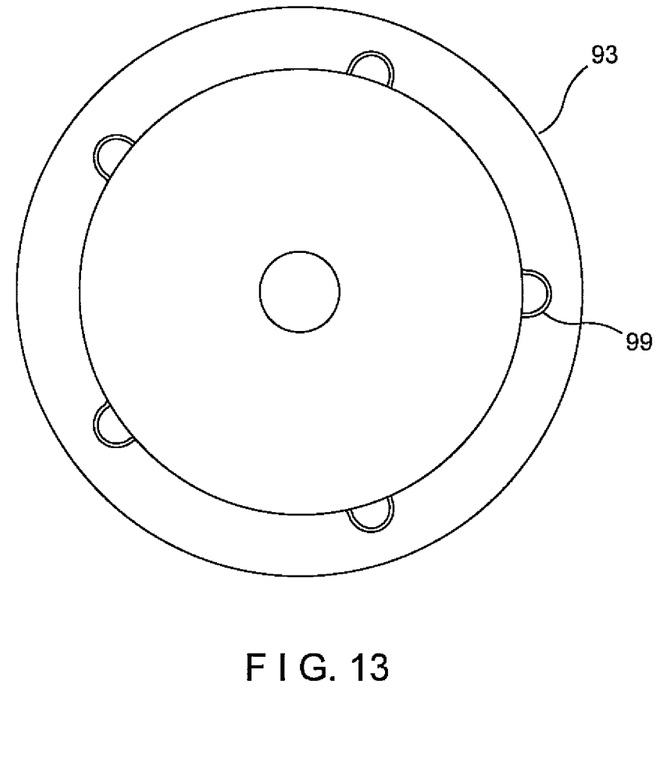
FIG. 13 is a top plan view of the ring to be attached to the back of the rear wheel.
Figure 14:
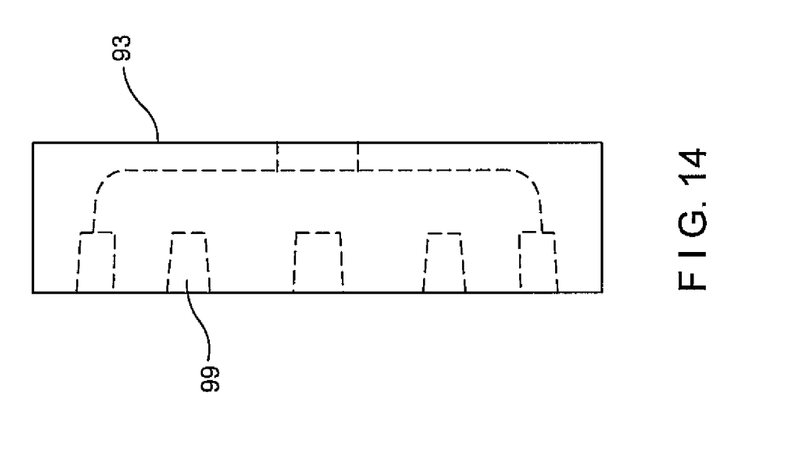
FIG. 14 is a side view of the ring of FIG. 13.

A simple conversion to manual power is completed through the removal of the cotter pins 105. The cotter pins 105 serve as a drivetrain disconnect. When the cotter pins 105 are removed from the axle 96, the springs 95 decompress causing the rings 93 to move outward and away from the hubs 91. The rings 93 move approximately ⅝ inches outward until they reach the second set of washer pairs 103. The machine screws 107 ensure that the rear wheels 26 do not disengage from the axle 96 when moved outward. The decompression of the springs 95 causes the hubs 91 and rings 93 to disconnect. This disconnection prevents the driving force from transferring from the hubs 91 to the rings 93, thereby allowing for manual operation. A the beach wagon 20 in the motorized position is shown in FIG. 7 and in the modified manual position in FIG. 8. Conversely, to return the beach wagon 20 to the motorized position, the rear wheels 26 are pushed inward compressing the springs 95. Once compressed, the cotter pins 105 are reinserted into the axle 96, locking the springs 95 in a compressed condition and reconnecting the hubs 91 and the rings 93.

Other variations of the embodiment shown can be utilized without departing from the spirit of the claims which follow. For example, variations of erecting flexible sidewalls can be made without utilizing spring rollers, the control panel for gear selection can be arranged with single pushbuttons for each function, and the application of power to the motor can be continuously variable. All such changes would be within the contemplation of the present invention.

What is claimed is:

1. A beach wagon convertible to a table, said beach wagon for transporting goods, said beach wagon comprising, in combination:
   an undercarriage having a front end, two sides and a rear end;
   a pair of front wheels with a yoke for manually pivoting said pair of front wheels to steer said beach wagon, said pair of front wheels depending from said front end of said undercarriage;
   a pair of rear wheels depending from said rear end of said undercarriage;
   a deck having a front end, two sides and a rear end, said deck disposed on said undercarriage and having a substantially rectangular perimeter;
   a pair of table leaves hingedly attached to and spaced apart from opposite sides of said substantially rectangular perimeter of said deck and operable between an open position and a closed position, said leaves in said open position forming opposite sides of a container for said goods, said leaves in said closed position forming a table and a compartment between table and said deck;
   a pair of container panels each formed from a web of flexible material selected from a group consisting of a polymeric laminate, a high-strength mesh, a woven technical textile, a nonwoven technical textile, and a high strength net, said pair of container panels stowable in said compartment formed by said deck and said table in said closed position, said container panels, when said table leaves are moved to an open position, attachable thereto to substantially enclose the open portion of said substantially rectangular perimeter of said deck;
   a pair of spring rollers mounted adjacent the open portions of said substantially rectangular perimeter within said compartment;
   said webs of material each mounted to said rollers, each of said webs of flexible material when extended forming a side of said container and when retracted stowable in said compartment;
   a drive motor attached to said undercarriage;
   gearbox means in cooperative functional relation with said drive motor for transmitting rotatory forces from said drive motor to said rear wheels;
   a battery connected to said drive motor;
   a wheel assembly depending from said rear end of said undercarriage, said wheel assembly further comprising:
   an axle, said axle having a pair of cavities;
   a pair of hubs disposed on said axle;
   a pair of rings disposed on said axle and set opposite said pair of hubs, said pair of rings each having two major surfaces, said pair of rings disposed within said pair of rear wheels;
   a pair of compression springs coiled around said axle, said pair of compression springs when compressed between said pair of hubs and said pair of rings providing an interconnection between said pair of hubs and said pair of rings;
   a first pair of flat washers adjacent said pair of rings, said first pair of flat washers set against said major surface of said pair of rings opposite said major surface of said pair of rings adjacent said pair of hubs;
   a pair of cotter pins adjacent said first pair of flat washers opposite said pair of rings, said pair of cotter pins removably disposed within said axle cavity;
   a second pair of flat washers adjacent said pair of cotter pins opposite said first pair of flat washers; and,
   a pair of machine screws securing said wheel assembly;
   whereby upon removal of said pair of cotter pins, said pair of compression springs are extended thereby disengaging said pair of hubs from said pair of rings allowing for manual operation.

2. A beach wagon as described in claim 1, wherein said pair of compression springs when disengaged extend said pair of front wheels outboard ⅝ inches.

3. A beach wagon as described in claim 1, wherein said pair of cotter pins are R-clips.

4. A beach wagon as described in claim 1, wherein said pair of machine screws upon decompression of said pair of compression springs prevents said pair of rear wheels from disengaging from said axle.

5. A beach wagon convertible to a table, said beach wagon for transporting goods, said beach wagon comprising in combination:
   a frame and drivetrain assembly having a front end and a rear end, said frame and drivetrain assembly, in turn, comprising:
   a drive motor attached thereto;

a gearbox in cooperative functional relation with said drive motor transmitting rotatory forces therefrom;

a drivetrain disconnect, said drivetrain disconnect removably attached to said frame and drivetrain assembly;

a battery connected to said drive motor;

a pair of front wheels with a yoke for manually pivoting said front wheels to steer said beach wagon, said wheels depending from said front end of said frame and drivetrain assembly;

a pair of rear wheel depending from said rear end of said frame and drivetrain assembly;

a handle attached to said yoke and extending forward beyond said front end enabling manual steering of said beach cart;

a deck disposed atop said frame and drivetrain assembly said deck having a substantially rectangular perimeter;

a pair of table leaves hingedly attached to and spaced apart from opposite sides of said rectangular perimeter of said deck and operable between an open position and a closed position, said leaves in said open position forming opposite sides of a container for said goods, said leaves in said closed position forming a compartment with said deck;

a pair of container panels adapted for storage in said compartment formed by said deck and said table leaves in said closed position, said container panels attachable to enclose the open portion of said perimeter remaining when said table leaves are moved to an open position;

a wheel assembly depending from said front end of said frame and drivetrain assembly, said wheel assembly further comprising;

an axle, said axle having a pair of cavities;

a pair of drivers disposed on said axle;

a drivetrain disconnect;

a pair of driven ends disposed on said axle set opposite said pair drivers, said pair of driven ends each having two major surfaces, said pair of driven ends disposed within said pair of rear wheels;

a pair of compression springs coiled around said axle, said pair of compression springs when compressed between said pair of drivers and said pair of driven ends providing an interconnection between said pair of drivers and said pair of driven ends;

a first pair of flat washers adjacent said pair of driven ends, said first pair of flat washers set against said major surface of said pair of driven ends opposite said major surface of said pair of driven ends adjacent said pair of drivers, said drivetrain disconnect adjacent said first pair of flat washers opposite said pair of driven ends, said drivetrain disconnect removable disposed within said axle cavity;

a second pair of flat washers adjacent said pair of cotter pins opposite said first pair of flat washers; and, a pair of machine screws securing said wheel assembly.

6. A beach wagon as described in claim 5, wherein said drivetrain disconnect is a pair of cotter pins, said pair of cotter pins adjacent said first pair of flat washers opposite said pair of rings, said pair of cotter pins removably disposed within said axle cavity, whereby upon removal of said pair of cotter pins, said pair of compression springs are extended thereby disengaging said pair of hubs from said pair of driven ends, thereby allowing for manual operation.

7. A beach wagon as described in claim 6, wherein said beach wagon, further comprises:

a gear selector mounted to said beach wagon adjacent said front end of said frame and drivetrain assembly, said gear selector adapted to enable an operator to select reverse gear, low gear, and high gear.

8. A beach wagon as described in claim 6, wherein said pair of machine screws upon decompression of said pair of compression springs prevents said pair of rear wheels from disengaging from said axle.

9. A battery-operated beach cart for transporting paraphernalia to the beachside, said beach cart being manually steerable by an operator and operable over hard and soft surfaces, said beach cart comprising, in combination:

a chassis and drivetrain assembly having an electrically driven motor and a gearbox mounted thereon;

a cargo container disposed on said chassis and drivetrain assembly, said cargo container having a floor, a front wall, a rear wall, a right-side wall and a left-side wall, said right side wall and said left side wall each being formed from a web of flexible material, said web of flexible material selected from a group consisting of a polymeric laminate, a high-strength mesh, a woven technical textile, and a high-strength net, said web of flexible material of said right-side wall being storable under spring tension on a first spring roller, said web of flexible material of said right-side wall being storable under spring tension on a first spring roller, said web of flexible material of said left-side wall being storable under spring tension on a second spring roller, said cargo container further comprising:

a gear selector panel enabling selection of reverse gear and one or more forward gears;

a pair of front wheels with a yoke for manually pivoting said front wheels, said pair of front wheels mounted on said chassis and drivetrain assembly for steering said beach cart;

a handle attached to said yoke and extending forward beyond said front wall enabling said operator to manually steer said beach cart;

an actuator mounted on said handle adapted to enable said operator to provide power and restrict power to said drivetrain assembly and thereby adapted to control the speed of the beach cart to match the walking speed of the operator;

hinge means for respectively attaching said front wall and said rear wall to said cargo container floor, said front wall and rear wall each being positionable between an open position for carting and a closed position for providing a planar table-top for beachside use, wherein a compartment is formed between said floor of said cargo container and said front wall and said rear wall, wherein said compartment is for storing said first spring roller with said web of flexible material of said right-side wall stored on said first spring roller in said closed position and said second spring roller with said web of flexible material of said left-side wall stored on said second spring roller in said closed position, wherein said web of flexible material of said right-side wall and said web of flexible material of said left-side wall are operable between a rolled condition and an unrolled condition; and, bracket devices affixed to said front wall and said rear wall for respectively retaining said web of flexible material of said right-side wall and said web of flexible material of said left-side wall;

a wheel assembly depending from said rear end of said chassis and drivetrain assembly, said wheel assembly further comprising:

an axle, said axle having a pair of cavities;

a pair of hubs disposed on said axle;

a pair of rings disposed on said axle and set opposite said pair of hubs, said pair of rings each having two major surfaces, said pair of rings disposed within said pair of rear wheels;

a pair of compression springs coiled around said axle, said pair of compression springs when compressed between said pair of hubs and said pair of rings providing an interconnection between said pair of hubs and said pair of rings;

a first pair of flat washers adjacent said pair of rings, said first pair of flat washers set against said major surface of said pair of rings opposite said major surface of said pair of rings adjacent said pair of hubs;

a pair of cotter pins adjacent said first pair of flat washers opposite said pair of rings, said pair of cotter pins removably disposed within said axle cavity;

a second pair of flat washers adjacent said pair of cotter pins opposite said first pair of flat washers; and, a pair of machine screws securing said wheel assembly;

whereby upon removal of said pair of cotter pins, said pair of compression springs are extended thereby disengaging said pair of hubs from said pair of rings, thereby allowing for manual operation.

10. A beach cart as described in claim 9 wherein said webs of flexible material of said right-side wall and said web of flexible material of said left-side wall, each further comprise:

a latching section having a pin projecting axially outward into said bracket devices of said front wall and said rear wall, said latching section, when engaged, being held by the spring tension of said first spring roller and said second spring roller respectively.

\* \* \* \* \*